(12) United States Patent
Denecke et al.

(10) Patent No.: US 7,200,320 B1
(45) Date of Patent: Apr. 3, 2007

(54) TIME CODE SLATE SYSTEM AND METHOD

(75) Inventors: Henry Michael Denecke, deceased, late of North Hollywood, CA (US); by Celia M. Denecke, legal representative, North Hollywood, CA (US); Charles Parra, Stevenson Ranch, CA (US)

(73) Assignee: Denecke, Inc., North Hollywood, CA (US)

( * ) Notice: Subject to any disclaimer, the term of this patent is extended or adjusted under 35 U.S.C. 154(b) by 1232 days.

(21) Appl. No.: 09/992,827

(22) Filed: Nov. 13, 2001

(51) Int. Cl.
*H04N 5/91* (2006.01)
*G03B 31/00* (2006.01)

(52) U.S. Cl. .......................................... 386/65; 352/3
(58) Field of Classification Search ................ None
See application file for complete search history.

(56) References Cited

U.S. PATENT DOCUMENTS

| | | | | |
|---|---|---|---|---|
| 3,528,731 A | * | 9/1970 | Bird ............................ | 352/90 |
| 5,457,507 A | * | 10/1995 | Berardi ......................... | 352/3 |
| 5,638,151 A | * | 6/1997 | Berardi ......................... | 352/3 |
| 6,831,729 B1 | * | 12/2004 | Davies .......................... | 352/3 |

* cited by examiner

*Primary Examiner*—Thai Q. Tran
*Assistant Examiner*—Heather R. Jones
(74) *Attorney, Agent, or Firm*—Fulwider Patton LLP

(57) ABSTRACT

A system and method for providing generated, synchronized, and displayed video time code for recording on film or videotape during the recording of the film or videotape in production. The system, in an embodiment thereof, comprises a slate wherein the generated, synchronized, and displayed video time code provides a visual marker for enabling post-production editing of the film or videotape. The slate enables generation of the video time code, synchronization thereof with a master clock audio time code, and displaying of the video time code. It also enables the setting of video and audio rates and modes of operation, the providing of portable power, and the retaining of data memory. The slate further enables scroll-back operations, and the displaying of operational parameters.

24 Claims, 21 Drawing Sheets

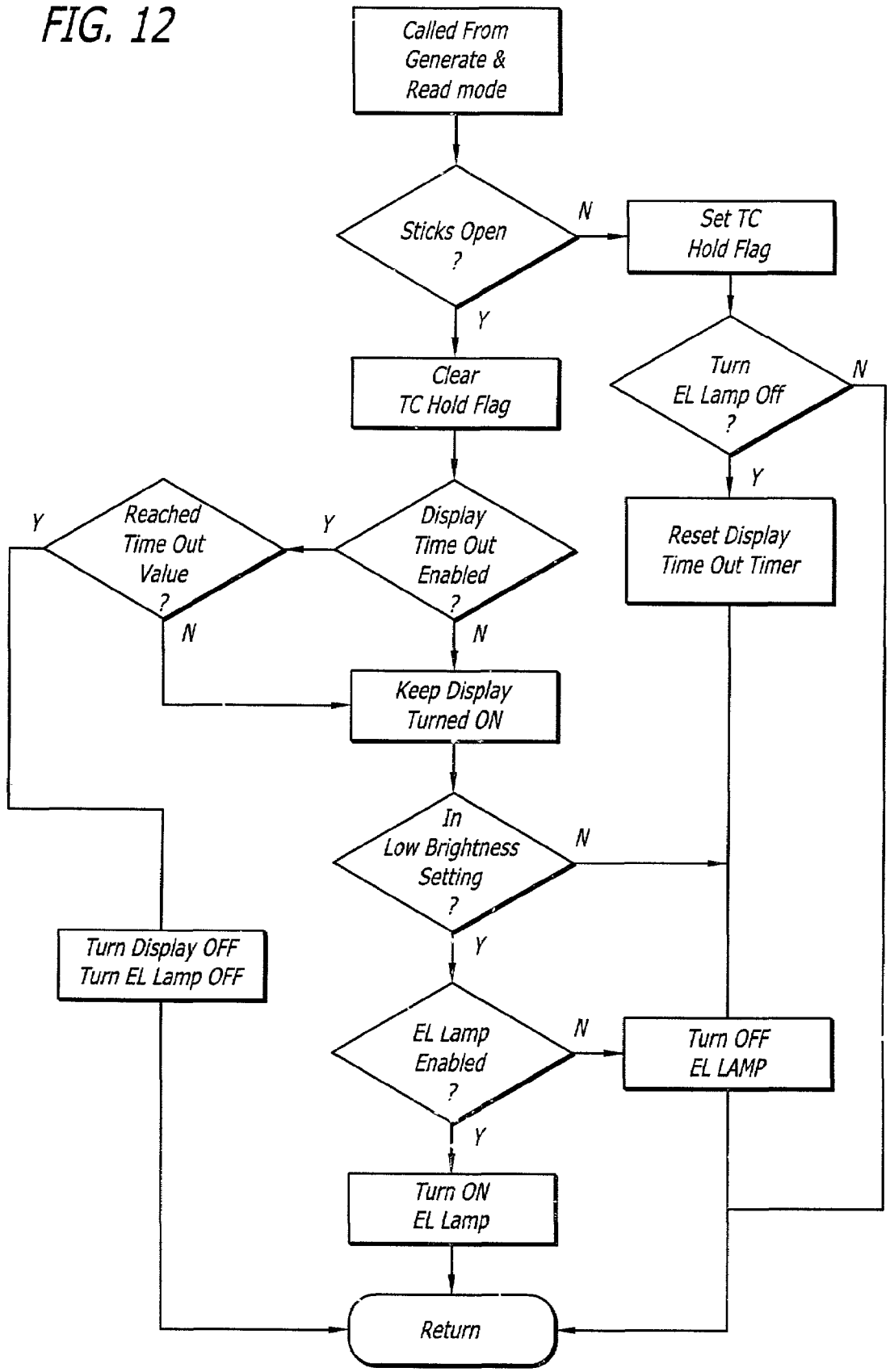
FIG. 12 — Check Sticks Routine

TIME CODE SLATE SYSTEM AND METHOD

BACKGROUND OF THE INVENTION

The present invention relates generally to improvements in the production of a film or videotape. In particular, it relates to a new and improved system and method for enabling the generating, synchronizing, and displaying of video time code for recording on film or videotape during the recording of the film or videotape in production.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

DESCRIPTION OF THE RELATED ART

The systems and methods of the present invention are particularly useful for enabling the generating of time code for recording during production of the film or videotape, synchronization of the generated time code with a master clock audio time code, and displaying of the generated and synchronized time code therein.

A variety of systems and methods have been developed over the years for generating time code, for recording of the time code during production of a film or videotape. One such system comprises a slate, which includes a panel including a display therein for displaying time code, and a surface thereon for enabling entry of production-related information thereon. The slate also includes a pair of clapper arms at the top of the panel, one of which is fixed, the other of which is pivotable relative to the fixed arm. It also includes electronics for driving the display, and a portable power source for providing power therefor. The time code display in the slate provides a visual marker for the film or videotape, and the closing of the pivotable clapper arm provides an audible marker therefor, for enabling post-production editing of the film or videotape.

The present invention provides improved systems and methods for generating, synchronizing, and displaying time code in a slate, for recording thereof during production of the film or videotape. It also enables the effective synchronization of the video time code with a master clock audio time code. The improved systems and methods of the present invention further enable the efficient setting of video and audio rates and modes of operation of the slate. Also, the invention enables the improved providing of portable power, the retaining of data memory, the enablement of scroll-back operations, and the displaying of operational parameters. The inventions disclosed herein satisfy these and other needs.

SUMMARY OF THE INVENTION

The present invention, in general, provides a new and improved system and method for effectively generating, synchronizing, and displaying video time code, for recording on film or videotape during production thereof. It enables the synchronization of the video time code with a master audio time code, in a system for recording the corresponding audio portion of the film or videotape in production. It also enables the setting of the video and audio rates and modes of operations, the providing of portable power, and the retaining of data memory. The invention further enables scroll-back operations, and the displaying of operational parameters.

More particularly, for example, in an embodiment of the present invention, a system is provided for generating, synchronizing, and displaying time code to be recorded on film or videotape during the recording of the video portion of a film or videotape in production, to be utilized in conjunction with a master clock time code recorded in a system for the recording of the corresponding audio portion of the film or videotape in production, wherein the audio recording system is external to the displaying system, and wherein the video time code displayed by the displaying system is synchronized with the audio time code recorded in the audio recording system. The system includes a generating element for generating, synchronizing, and displaying the video time code, mounted in the system. The system further includes a display for displaying the video time code, to which the generating element is connected, mounted in the system.

The above objects and advantages of the present invention, as well as others, are described in greater detail in the following description, when taken in conjunction with the accompanying drawings of illustrative embodiments.

BRIEF DESCRIPTION OF THE DRAWINGS

FIG. 12 is a flow chart of another routine, in the practice of the invention.

DETAILED DESCRIPTION OF THE PREFERRED EMBODIMENTS

Figure 1:
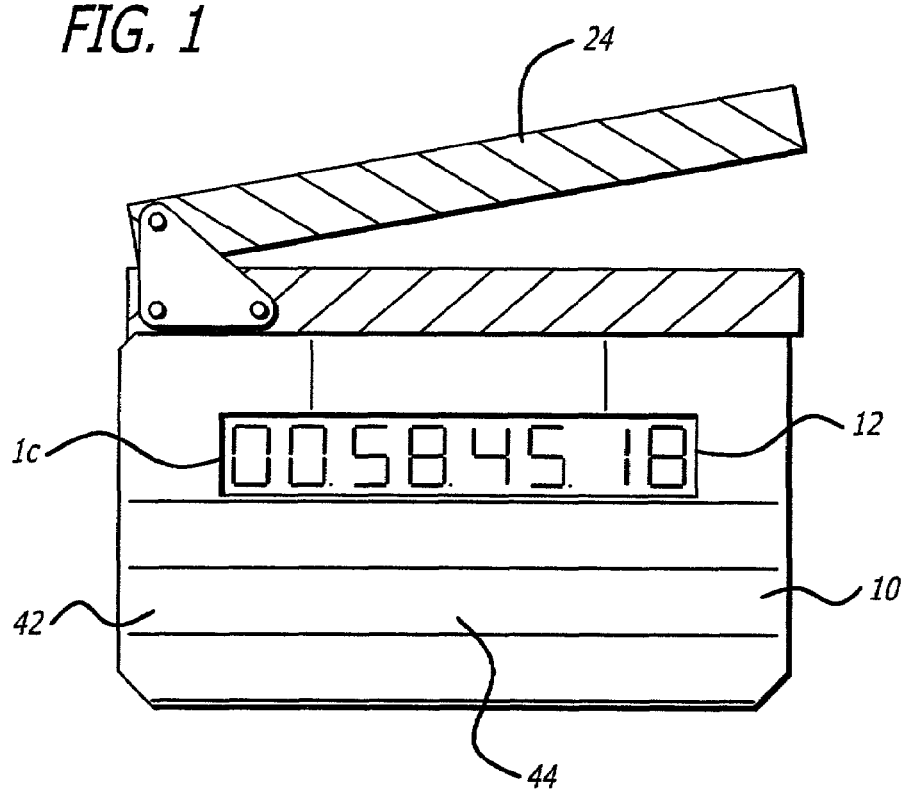
FIG. 1 is an elevational front view of a system pursuant to an embodiment of the present invention.
Figure 2:
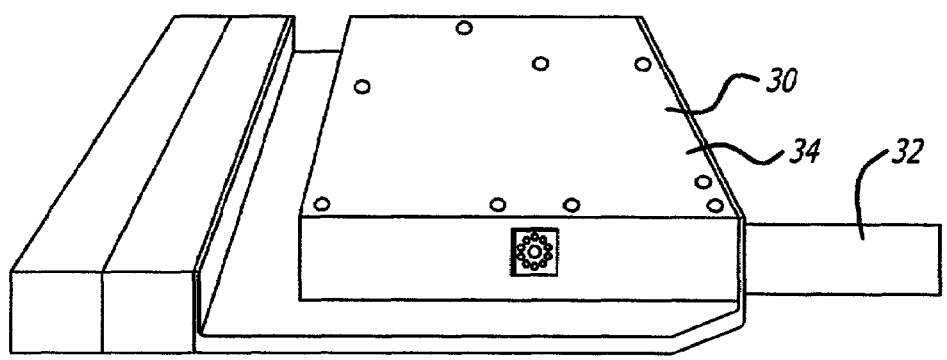
FIG. 2 is side perspective back view of the system in FIG. 1 in accordance with an embodiment of the invention.
Figure 3:
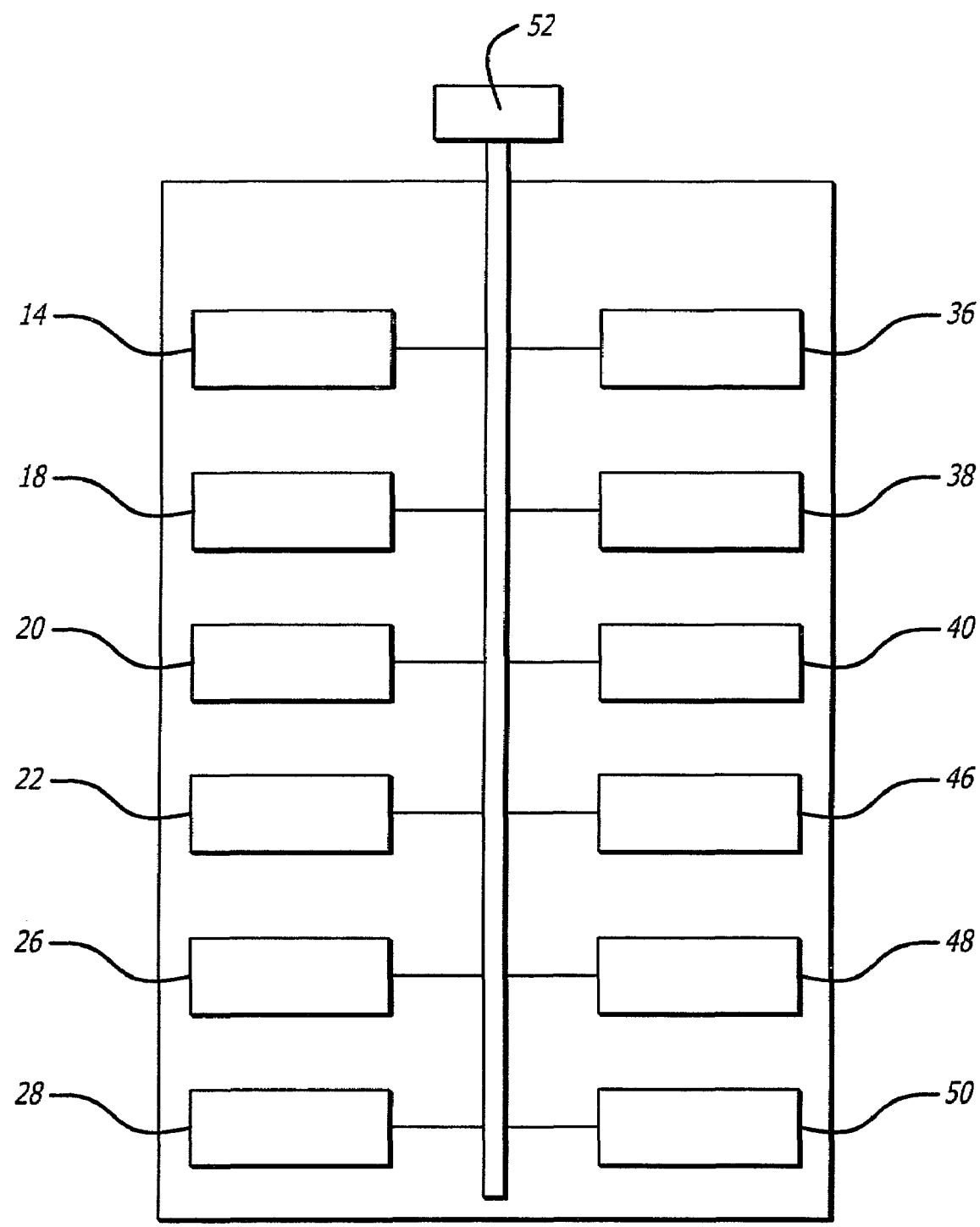
FIG. 3 is a block diagram of elements of the system, in an embodiment of the invention.

The present invention is directed to an improved system and method for efficiently generating, synchronizing, and displaying video time code to be recorded on film or videotape during the recording of the video portion of a film or videotape in production. The invention enables the effective synchronization of the video time code with a master clock time code recorded in a system for the recording of the corresponding audio portion of the film or videotape in production. The present invention is further directed to setting video and audio rates and modes of operations, providing portable power, retaining data memory, enabling scroll-back operations, and displaying operational parameters, in a convenient and effective manner. The preferred embodiments of the improved system and method are illustrated and described herein by way of example only and not by way of limitation.

In the drawings, wherein like reference numerals denote like or corresponding parts throughout the drawing figures, and particularly in a preferred embodiment in accordance with the invention as shown in FIGS. 1–13, for example, a system 10 is provided for generating, synchronizing, and displaying time code 12 to be recorded on film or videotape during the recording of the video portion of a film or videotape in production. The system 10 preferably comprises a slate. The slate 10 of the present invention is utilized in conjunction with a master clock time code, recorded in a system for recording of the corresponding audio portion of the film or videotape in production. The audio recording system is external to the slate 10. The video time code 12 which is displayed by the slate 10 is synchronized with the audio time code recorded in the audio recording system.

Referring to FIGS. 1–4, in the preferred embodiment pursuant to the present invention, for example, the slate 10 includes a reading element 14, for reading and enabling the displaying of the synchronized video time code 12, mounted in the slate 10. It further includes a display 16, for displaying the synchronized video time code 12, to which the reading element 14 is connected, mounted in the slate 10.

The slate 10 further includes a rate-setting element 18, for enabling the setting of a video frame rate in the slate 10, and a rate-warning element 20, for warning the operator if the video frame rate set in the slate 10 is different from an audio frame rate set in the audio recording system external to the slate 10. A rate-determining element 22 in the slate 10 automatically determines an audio frame rate set in the audio recording system external to the slate 10, and locks the video frame rate to the audio frame rate.

A clapper 24 in the slate 10 is closed at the start of a take, and freezes the time code displayed in the display 16 at the start of the take. The clapper 24 enables the video recording of the time code at the start of the take, and enables the synchronizing of the video time code and the audio time code at the start of the take, for synchronizing the recorded video with the recorded audio. A scroll-back element 26 in the slate 10 enables the operator to scroll back to the display of time code at the start of a prior take. The scroll-back element 26 enables scrolling back to the display of time code for the start of each of a plurality of prior takes. The plurality of prior take portions may comprise for example about sixteen prior take portions.

The slate 10 also includes a portable power supply 28, for supplying portable power to the slate 10, a compartment 30, for containing the portable power supply 26, and a sliding door 32, adapted to cover and enable access into the compartment 30. The portable power supply 28 comprises a plurality of batteries. The plurality of batteries 28 comprise for example six double-A batteries. A battery pack 34 in the slate 10 contains the plurality of batteries 28 to be installed in the compartment 30. The compartment 30 houses a plurality of control knobs, and the sliding door 32 uncovers the control knobs for access thereto without uncovering the portable power supply 24.

A voltage-displaying element 36 in the slate 10 displays the voltage of the portable power supply 28. The voltage-displaying element 36 displays the portable power voltage in the display 16 under load upon starting up the system. A low-power warning element 38 in the slate 10 warns of low portable power. A no-power warning element 40 in the slate 10 warns of no power in the portable power supply. The slate 10 further includes a face plate 42, which includes an area 44 thereon for enabling the written entry of information relating to the production. The production-related information to be written in the written-entry-enabling area 44 comprises for example camera logs. The camera logs include for example the type of film roll being used and the current film roll in production.

The slate 10 of the invention also includes a settings element 46 for enabling the setting of modes of operation of the slate 10, and an adjusting element 48 for enabling the adjustment of the settings in the setting element 40. The adjusting element 48 comprises for example an adjustment setting button, which changes the setting upon actuation thereof. The slate 10 also includes a settings remembering element 50, which remembers the settings when there is no power in the system 10. The settings element 46 further includes a non-volatile memory for the modes settings, which retains the memory without backup power. The settings element 46 includes a hold clap frame mode, responsive to the clapper 24 upon closing thereof at the end of the take, wherein the hold clap frame mode may be set so as to enable the display of the start time of the take, upon the passing of a set period of time after the display 16 turns off, upon the closing of the clapper 24 after the opening thereof upon the start of the take, to enable the observation of the start take time after the end of the take.

The settings element 46 also includes a battery life conserving mode, which enables setting thereof so as to enable the display 16 to turn off after a set period of time. The settings element 46 further includes a synchronization reminding mode, which enables setting thereof so as to remind the user to periodically re-synchronize the video time code and the audio time code. Setting of a synchronization locking mode is enabled by a setting in the settings element 46 so as to indicate that the video time code and audio time code have been synchronized, and that the system 10 has been turned on, turned off, and turned on again, alerting the user to re-synchronize the video time code and the audio time code. A flash frame mode in the settings element 46 enables setting thereof so as to increase the intensity of the display upon closing the clapper 24 to display a flash frame, and to hold the intensified display for a number of frames. Setting of a low brightness mode is enabled by a setting in the settings element 46, so as to enable the lowering of the brightness of the display 16.

Figures 1, 4:
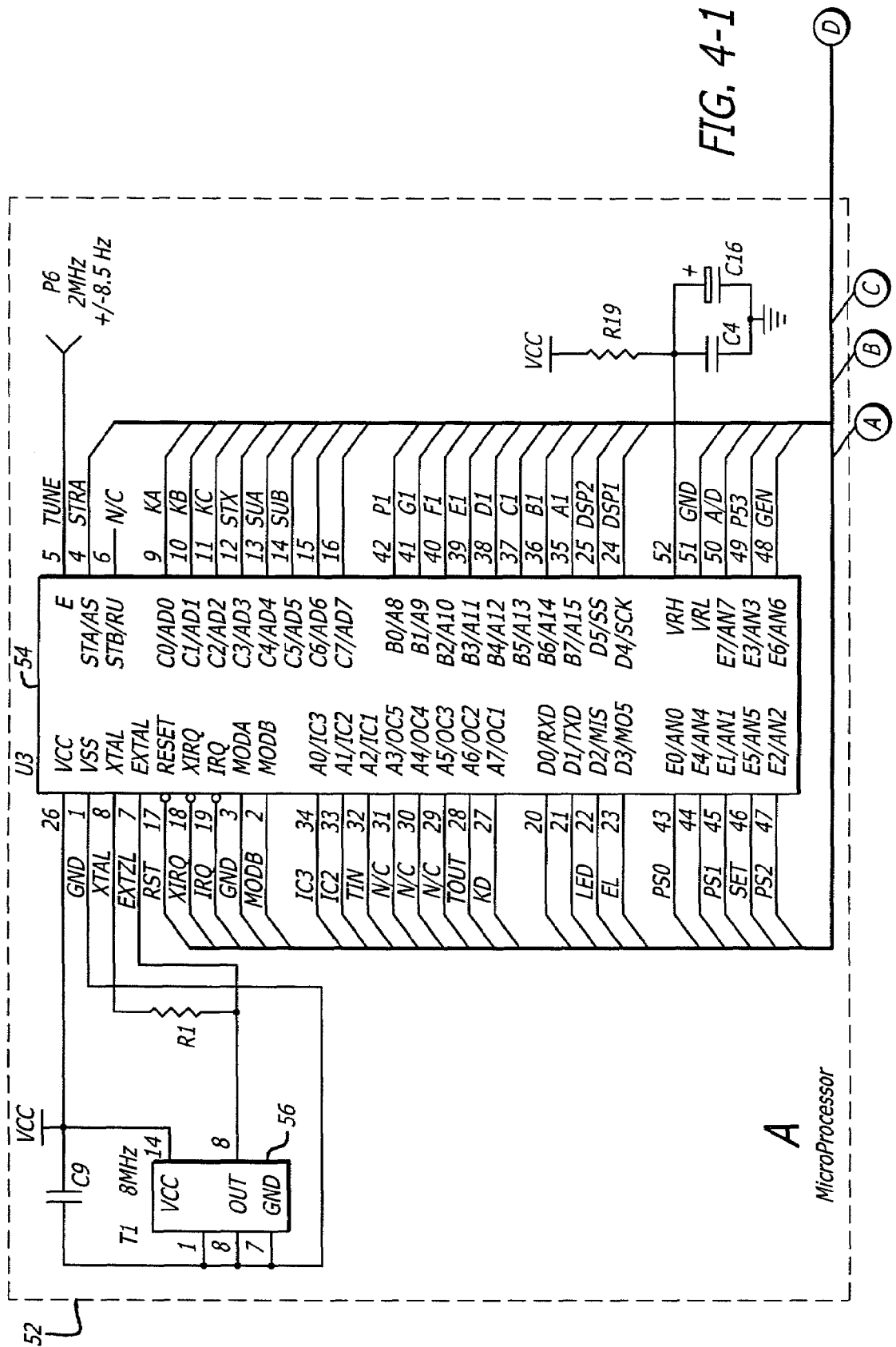
FIG. 4 is a circuit diagram of elements of the system in the practice of the invention.
Figure 4:
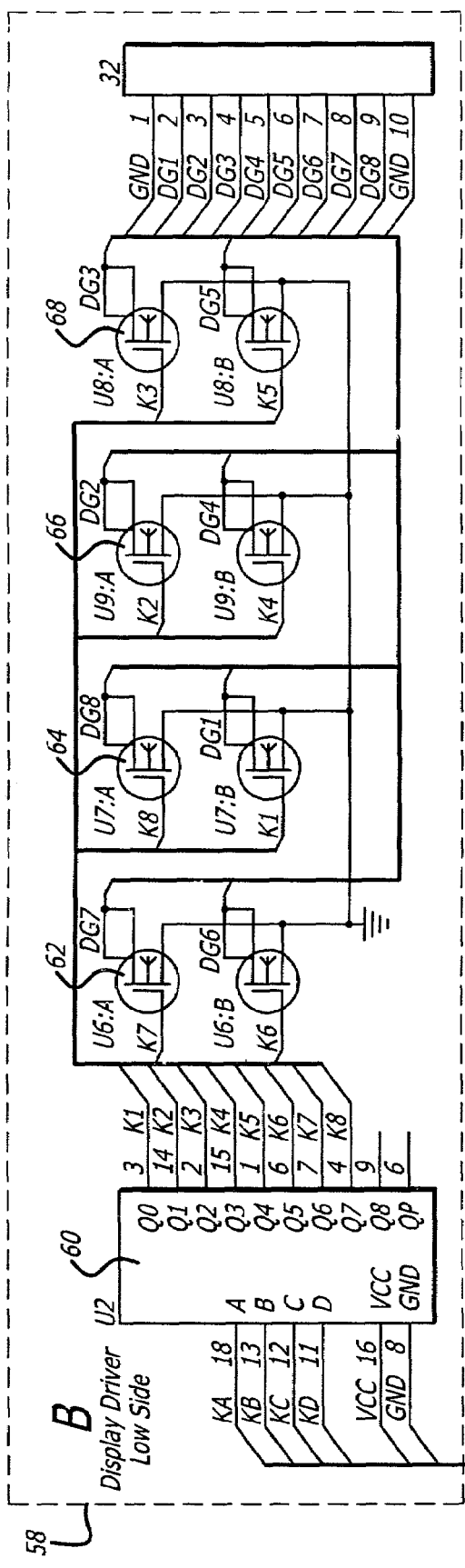
Figure 2:
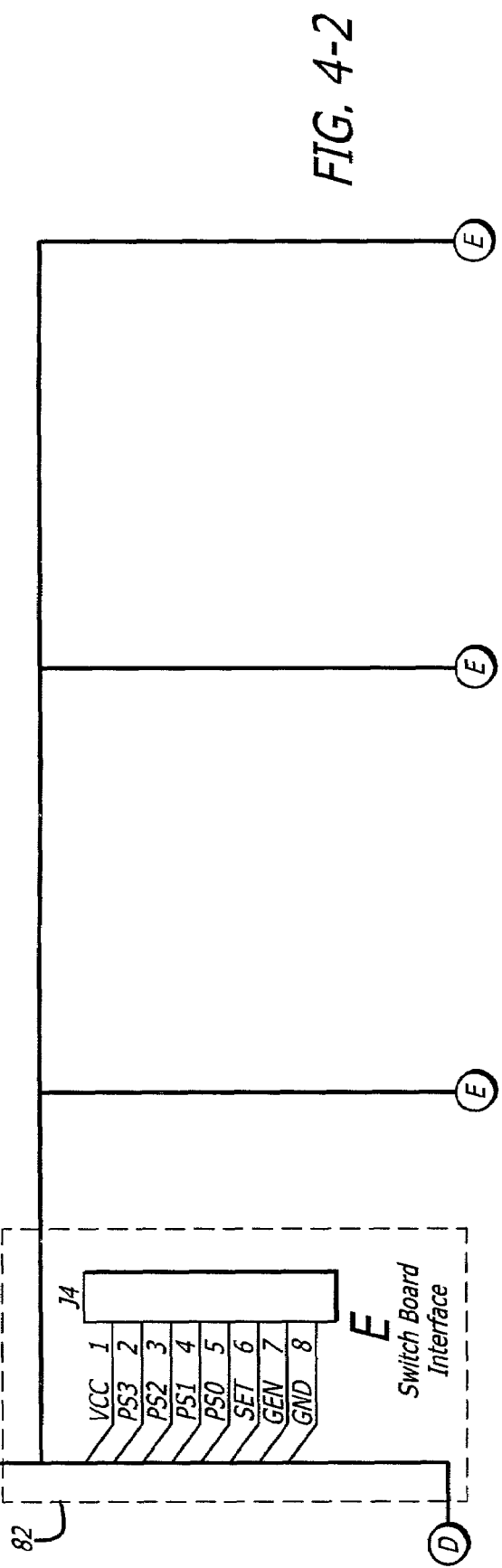
Figures 3, 4:
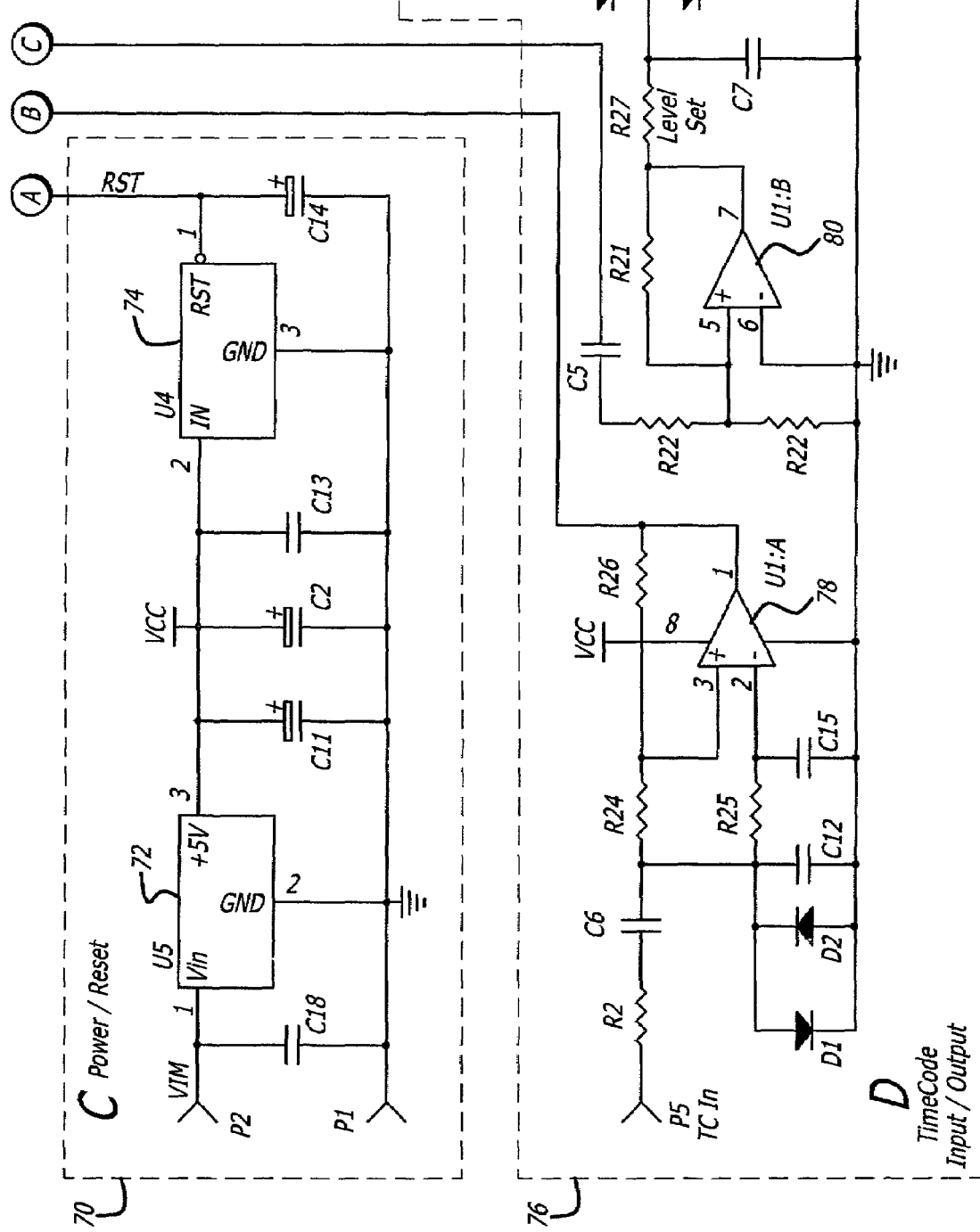
Figure 4:
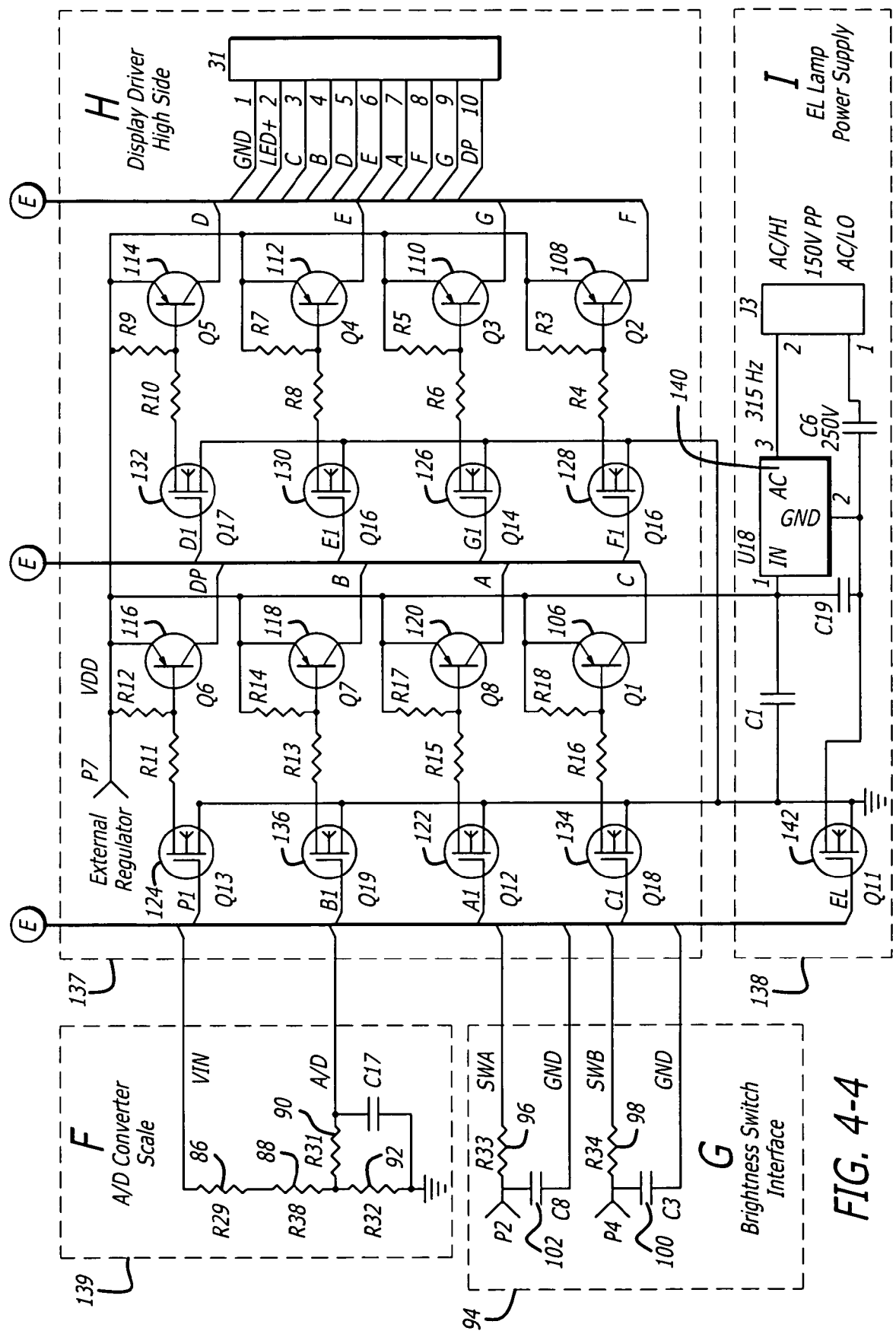
Figure 5:
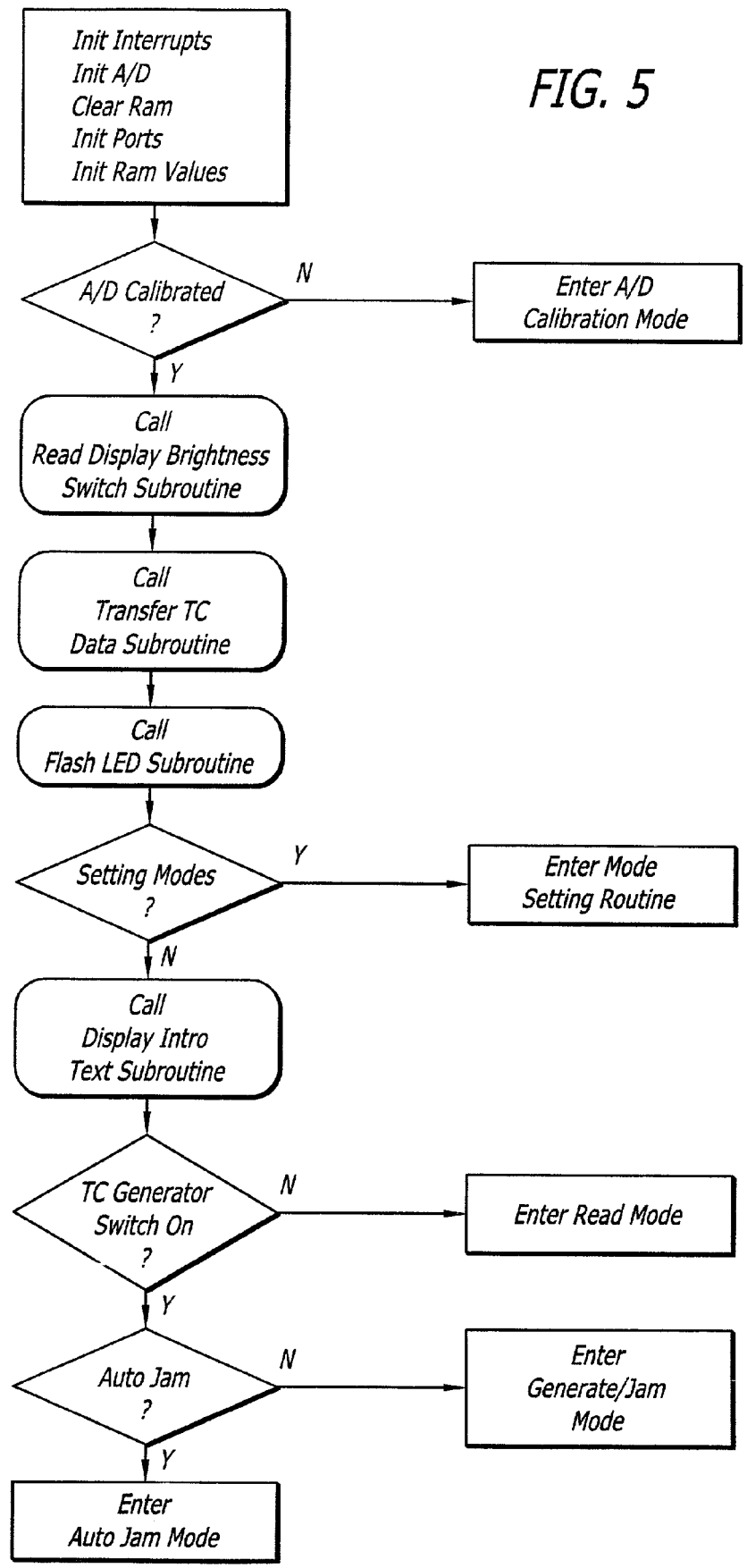
FIG. 5 is a flow chart of an initialization routine, in accordance with the invention.
Figure 6:
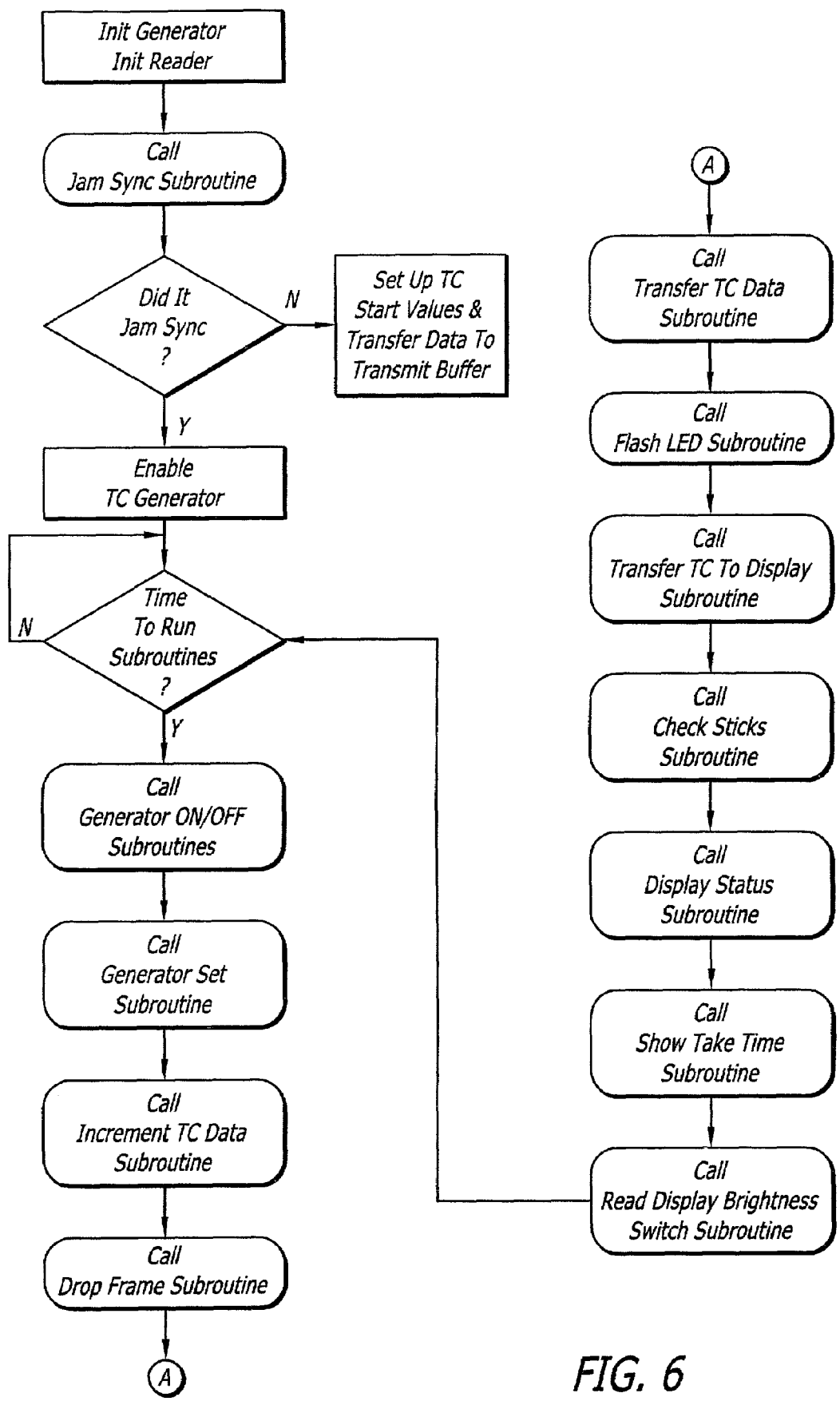
FIG. 6 is a flow chart of another initialization routine, pursuant to the invention.
Figure 7:
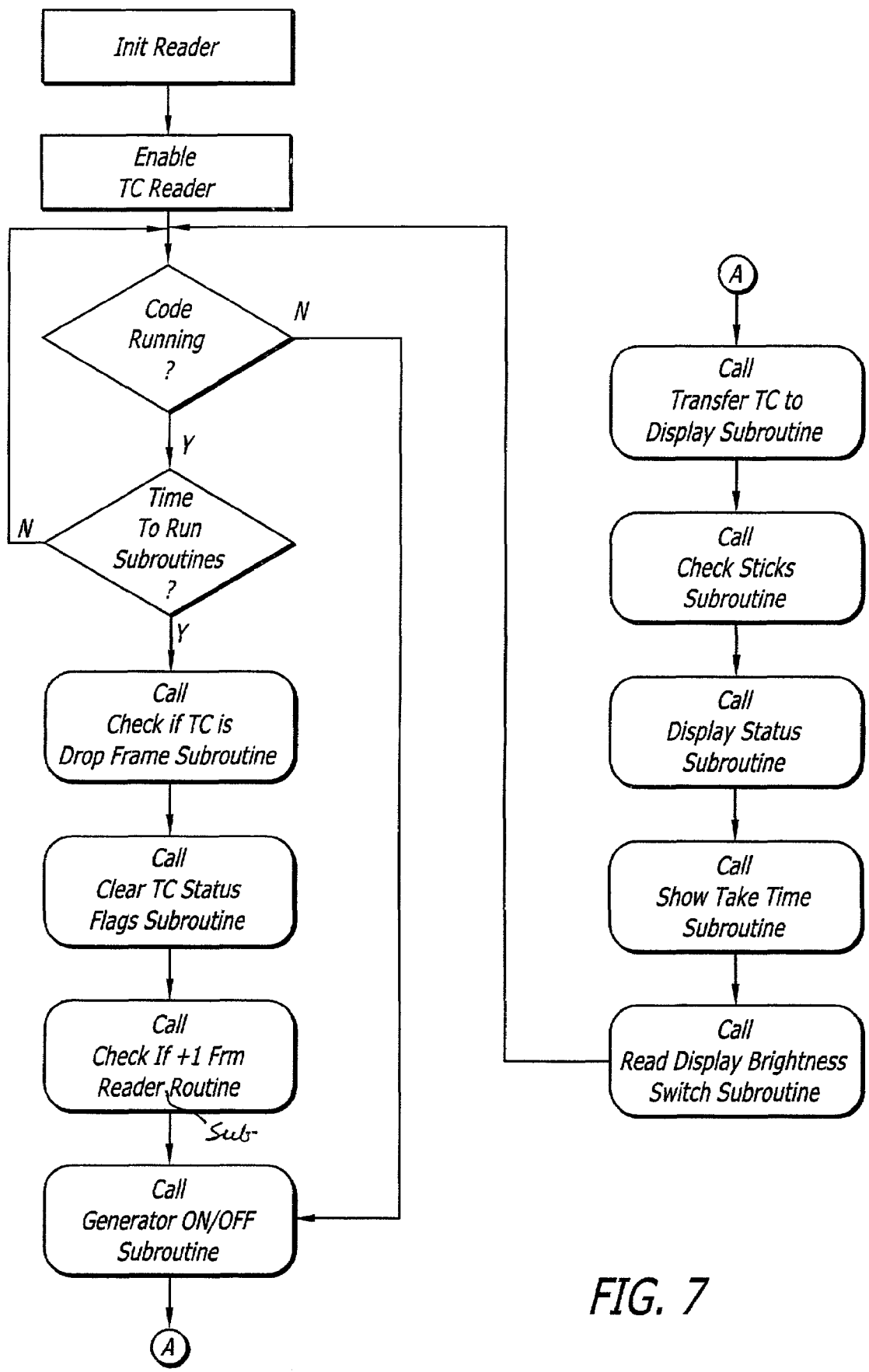
FIG. 7 is a flow chart of a further initialization routine, in the practice of the invention.
Figures 8A, 8B:
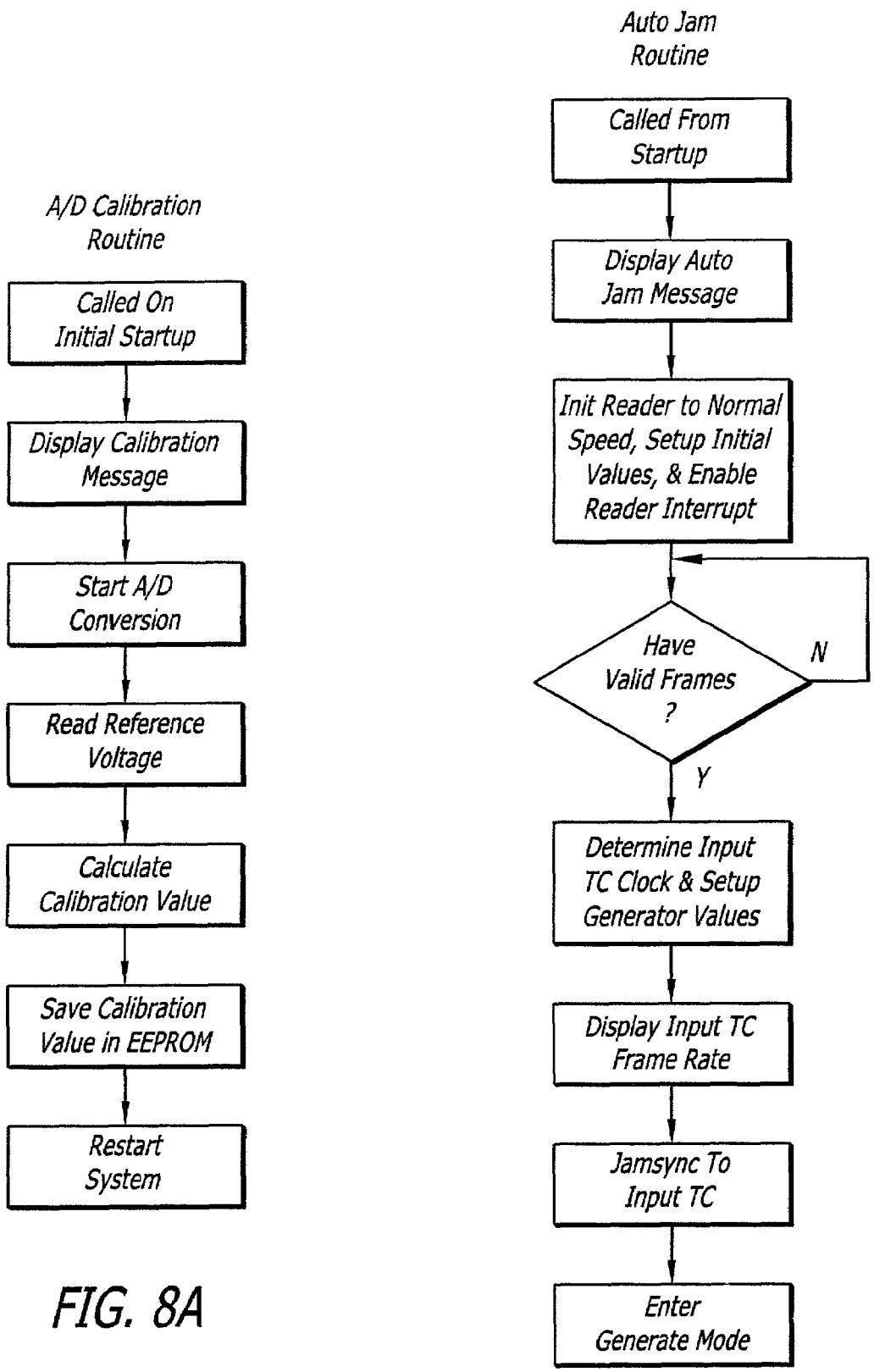
FIG. 8 is a flow chart of routines, pursuant to the invention.
Figure 8C:
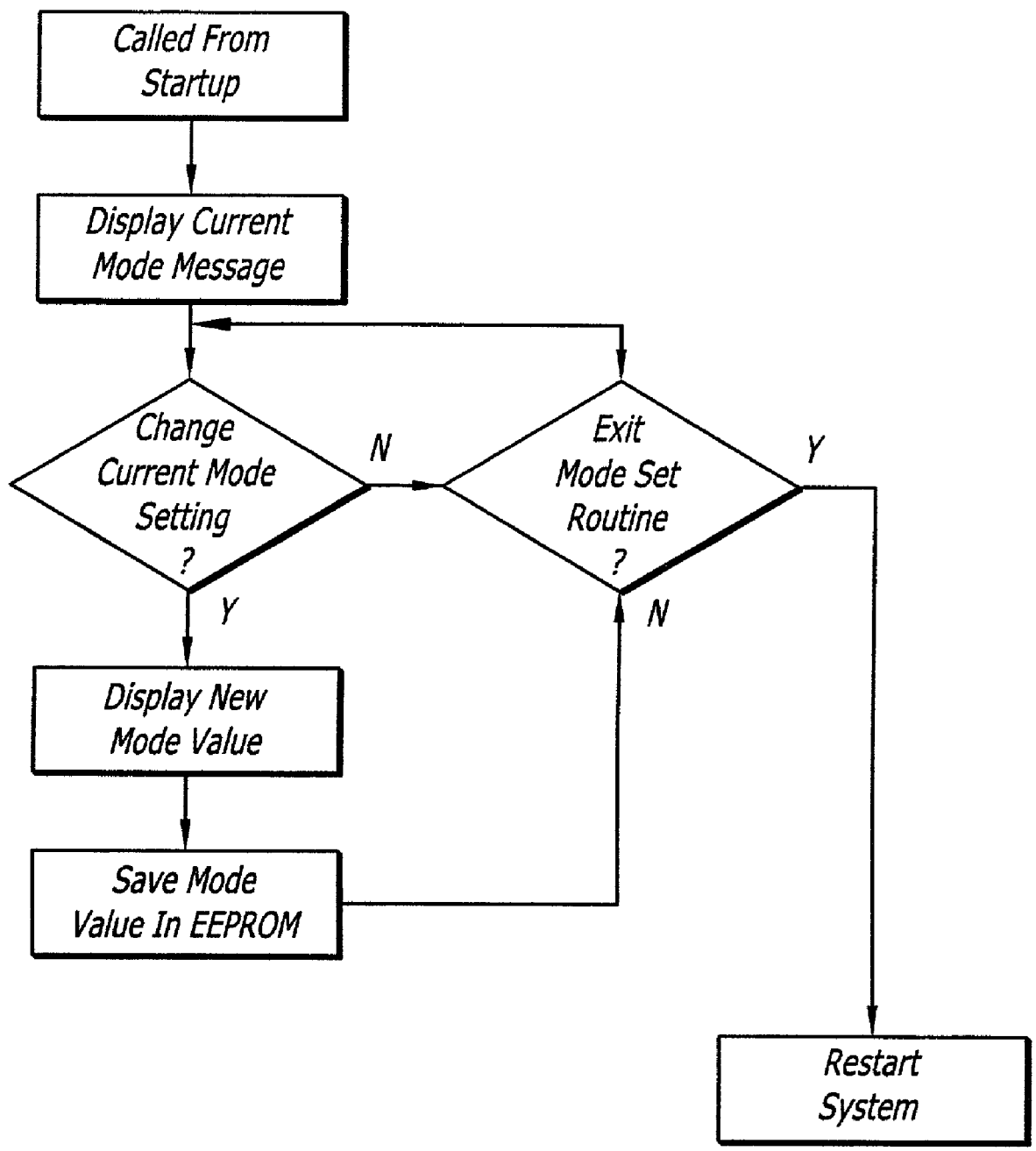
Figure 9A:
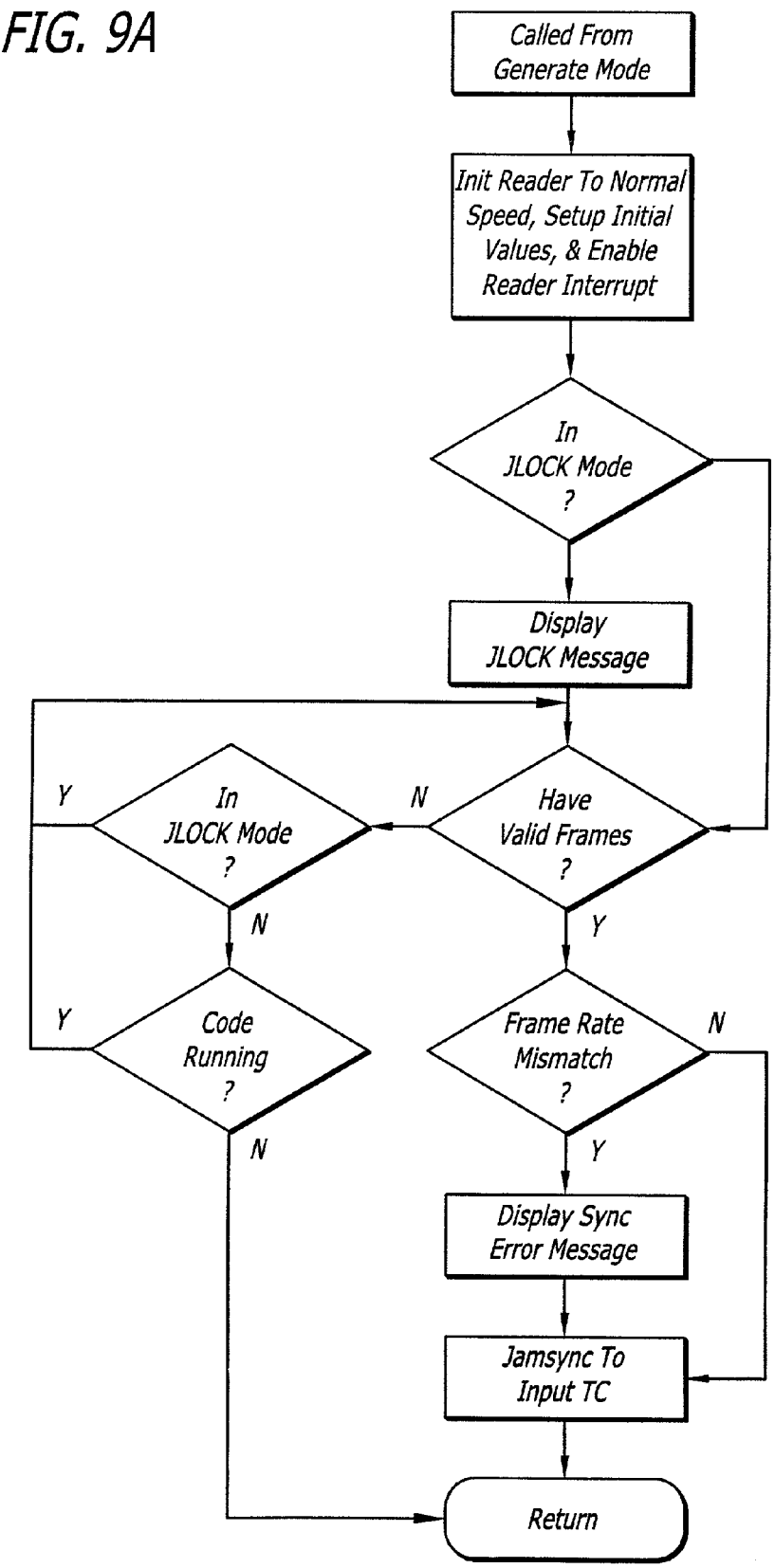
FIG. 9 is a flow chart of other routines, in accordance with the invention.
Figure 9B:
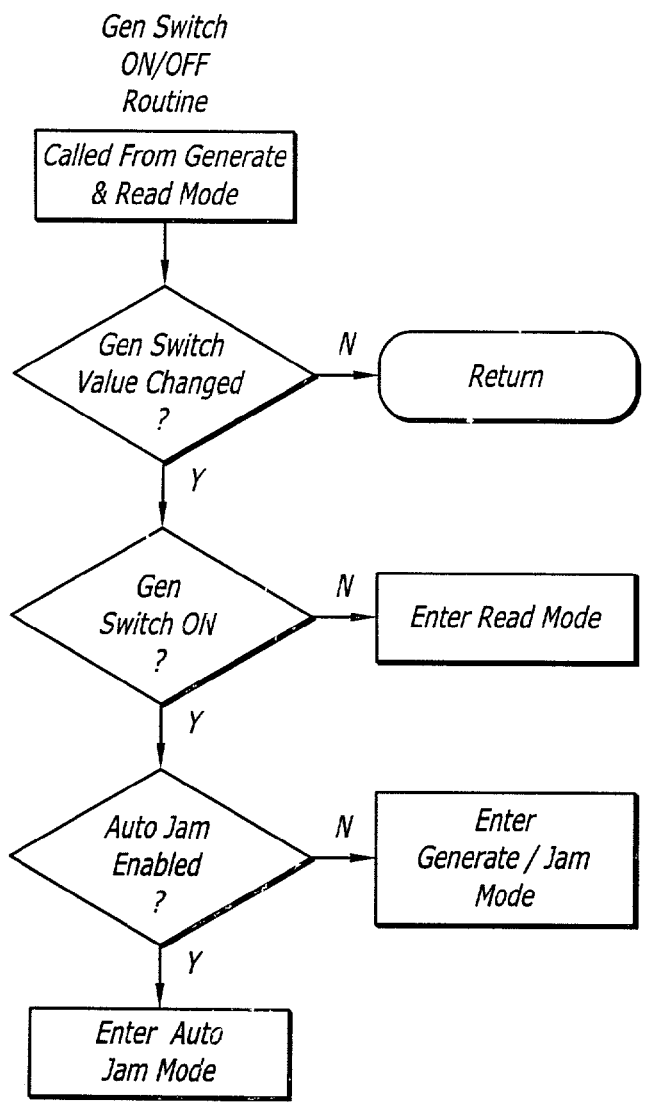
Figure 9C:
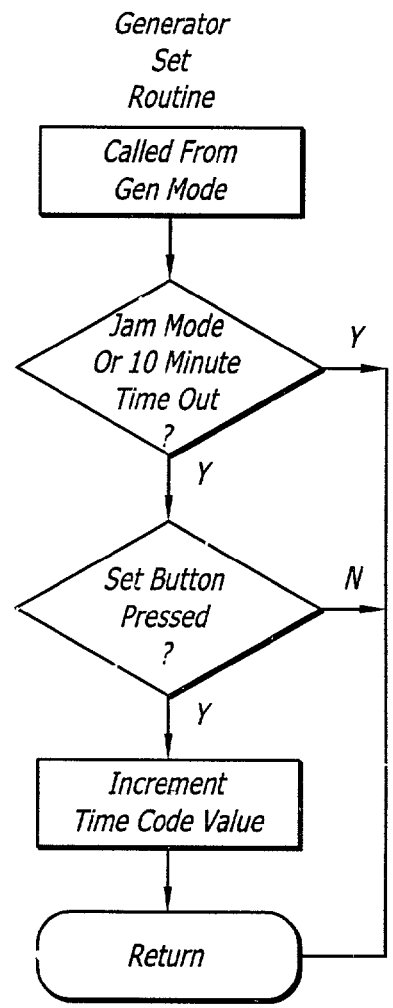
Figures 10A, 10B:
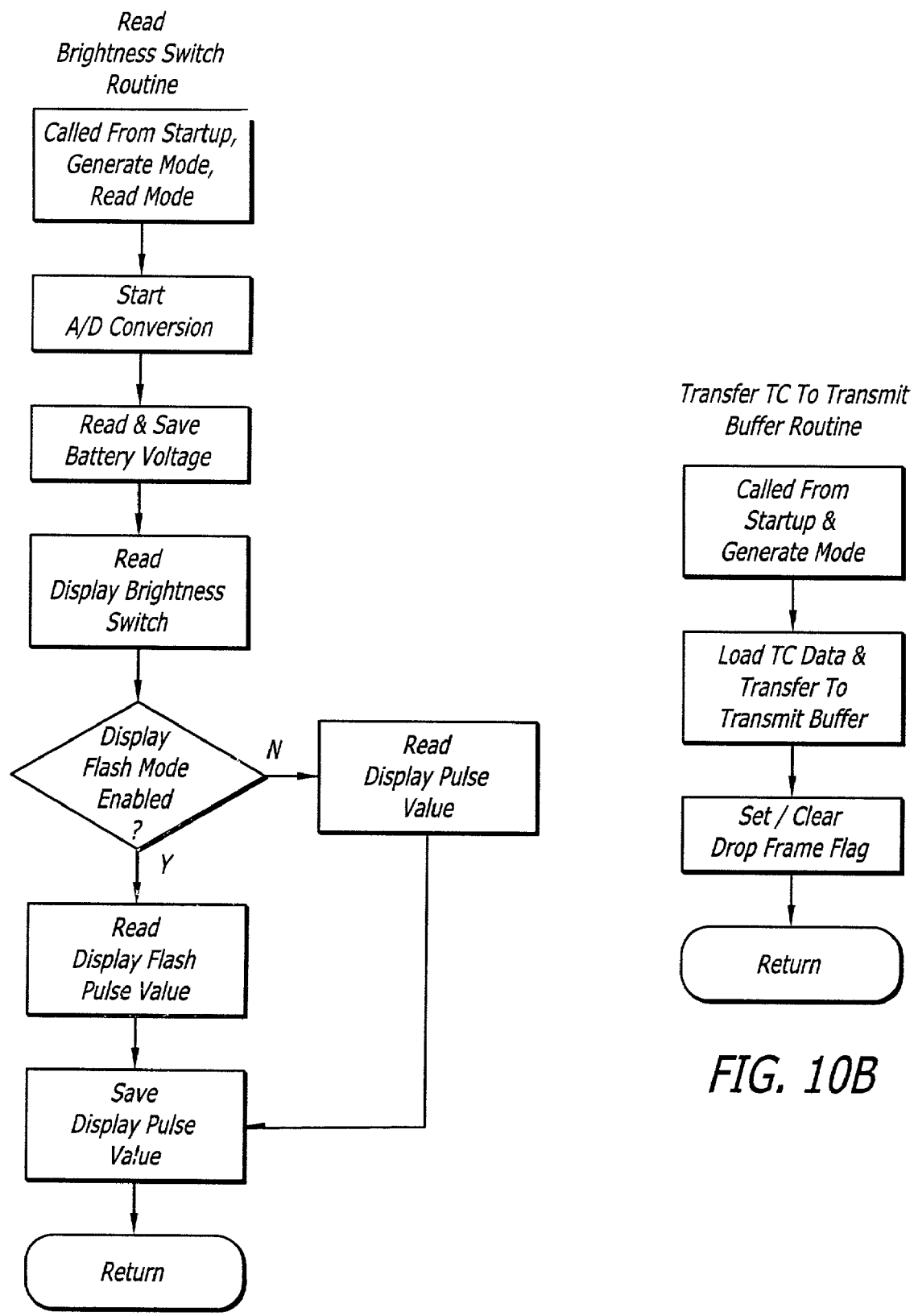
FIG. 10 is a flow chart of further routines, in the practice of the invention.
Figure 10C:
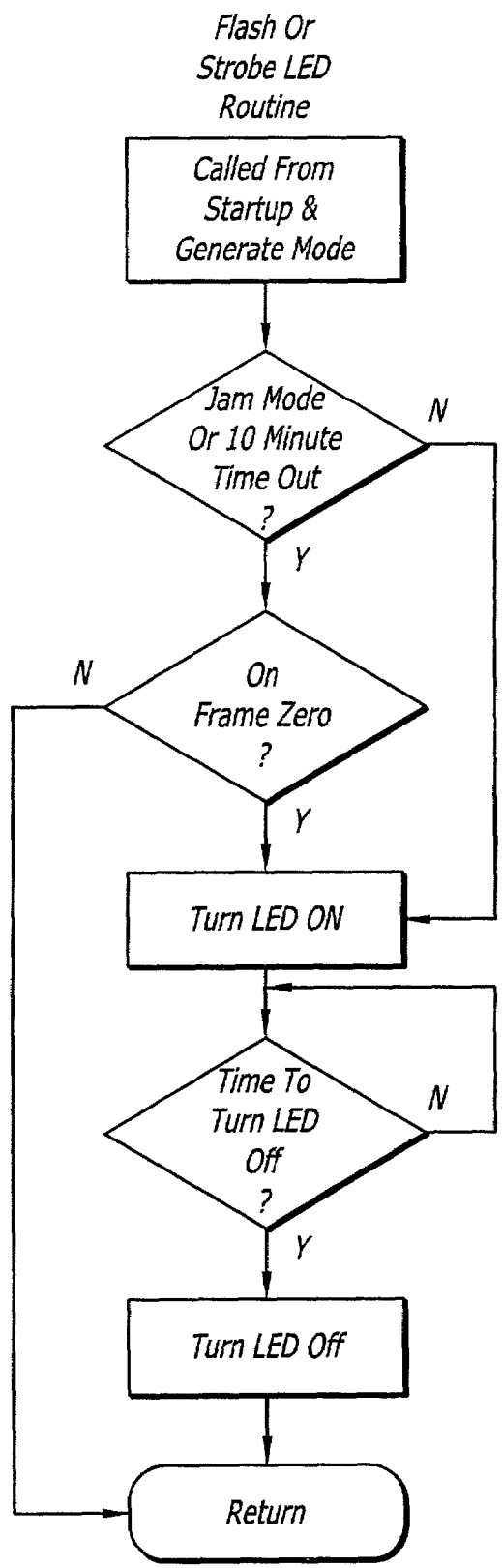

As seen in FIG. 4, for example, the system 10 includes a microprocessor 52, for providing time code decoding/reading and time code generation for the reading element 14, and a display control for the display 16. The microprocessor 52 further provides analog to digital conversion for the battery voltage for the portable power supply 28, and general processing for the system 10, such as reading switches in the settings element 46, and reading the sticks in the clapper 24. The microprocessor 52 includes a chip 54, which, for example, may be a Motorola 68HCII, and an oscillator 56, such as an 8 MHz Temperature Compensated Crystal Oscillator.

A time code display low side driver 58 sinks the display current. It includes for example a 4028 Binary Coded Decimal (BCD) to decimal (one-of-ten) decoder 60, and a plurality of N Channel Power Metal-Oxide-Semiconductor Filed-Effect Transistors (MOSFETs) 62, 64, 66 and 68 (two per chip). The microprocessor 52 multiplexes the low side driver circuit, to determine which digit should be ON.

Power and reset circuits 70 for the mother board include a low dropout voltage regulator 72, such as an LM2931 5 volt unit, for supplying voltage to the microprocessor 52 and support circuits. A reset chip 74, for example an 8054 reset chip, supervises the regulator 72, shuts down the microprocessor 52 if the voltage is out of range, and delays the startup of the microprocessor 52 until the voltage regulator 72 reaches a safe and steady voltage.

Time code input and output circuits 76 include comparators 78 and 80, for example TLC3702 comparators. The comparator 78 and its support hardware reshapes the input time code signal and feeds it to the microprocessor 52. The comparator 80 and its support hardware reshapes the time code output from the microprocessor 52, and reshapes it to the SMPTE time code and fall time standard.

An interface 82 is provided for a switch board (not shown). The switch board has a generator on/off switch, a generator set push button, and a generator time code speed select/option set BCD rotary switch. The microprocessor 52 reads this port and determines the time code frame rate and other setting. The interface 82 also supplies power and ground to the switch board.

An Analog to Digital conditioning scale circuit 84 includes resistors 86, 88, 90, and 92 which scale the input voltage to the A/D on the microprocessor 52. The scale, for example, may be five volts in equals one volt to the A/D at minimum scale, and twenty-three volts in equals about five volts to the A/D at maximum scale.

A brightness switch interface 94 includes resistors 96 and 98, and capacitors 100 and 102, which protect the microprocessor 52 from malfunction, misuse, or the like. The microprocessor 52 reads this port and determines the display pulse width in display brightness for the current switch setting.

A high side display driver 104 drives the segments on the LED display. Transistors 106, 108, 110, 112, 114, 116, 118 and 120 for example are 2N4403 PNP transistors which source the current to the segments of the LED display. Transistors 122, 124, 126, 128, 130, 132, 134, and 136 are for example 2N7000 N channel DMOS FET transistors, which drive the base of the PNP transistors and protect and buffer the microprocessor 52. The microprocessor 52 determines which segment should be turned on for the current digit data. The input 137 is the input from a display regulator.

An electroluminescent power supply 138 supplies power for a front panel on the slate 10. An inverter 140 for example converts five volts DC to one-hundred fifty volts AC. A transistor 142 turns the power supply on and off through the microprocessor 52, and may comprise for example a 2N7000 N channel DMOS FET transistor.

Referring to FIGS. 1–13, in a method for the use of the preferred embodiment in accordance with the present invention, for example, the system 10 displays video time code 12 to be recorded on film or videotape during the recording of the video portion of a film or videotape in production, for use in conjunction with a master clock audio time code. The master clock audio time code is recorded external of the slate 10 in a system for the recording of the corresponding audio portion of the film or videotape in production, and the video time code 12 is synchronized with the recorded audio time code. The video time code is generated, synchronized, and displayed in the slate 10.

The video frame rate is set in the rate-setting element 18, and the operator is warned if the set video frame rate differs from the set audio frame rate by the rate-warning element 20. The set audio frame rate is automatically determined by the rate-determining element 22, and the video frame rate is locked to the audio frame rate therein.

The clapper 24 is closed at the start of a take, and the time code which is displayed in the display 16 is frozen at the start of the take. The display of time code may be scrolled back at the start of the take, and may scroll back to the time code display for the start of each of a plurality of prior takes, such as sixteen prior takes, in the scroll back element 26.

Portable power is supplied to the slate 10 by the portable power supply 28, such as a plurality of batteries in a battery pack 34, for example six double-A batteries, which are installed in the compartment 30 upon sliding the door 32 to enable access thereinto. The control knobs in the slate 10 may be uncovered by sliding the sliding door 32, without uncovering the portable power supply 28. The voltage of the portable power supply 28 under load may be displayed in the voltage-displaying element 36 upon starting up the slate 10. A warning of low portable power in the portable power supply is provided by the low-power warning element 38. A warning of no power is provided by the no-power warning element 40. Information relating to the production, such as camera logs, the type of film roll being used, and the current film roll in production, is entered in writing in the area 44 in the face plate 42 of the slate 10.

The setting of the modes of operation of the slate 10 is provided through the settings element 46. The settings in the settings element 46 are adjustable in the adjusting element 48, by adjusting an adjustment setting button. The settings in the settings element 46 are remembered in the settings remembering element 50 when there is no power in the slate 10, and may be remembered without backup power. The settings element 46 may also be set to enable the display 16 to turn off after a set period of time, and to remind the user to periodically re-synchronize the video time code and the audio time code. The settings element 46 may be set so that upon closing the clapper 24 at the end of the take, the display 16 turns off, and the total time of the take is displayed upon the passing of a set period. The settings element 46 may further be set to indicate that the video time code and the audio time code have been synchronized, and that the slate 10 has been turned on, turned off, and turned on again. The settings element 46 may be set to increase the intensity of the display 16 upon closing the clapper to display the flash frame, and to hold the intensified display for a number of frames. It may also be set to enable the lowering of the brightness of the display 16.

The operation of time code standard software in the system 10 includes detecting the electronic binary arithmetic time code word prerecorded as the master clock time code. Such prerecorded time code word is utilized to uniquely identify each video frame, as described in "Time Code Handbook" by Hickman and Merhan (1982), in Chapter 2 thereof, incorporated by reference herein.

The time code information is encoded in bi-phase modulation, with a binary "0" created when the signal shifts either high or low, up or down, and with a binary "1" created when there is a second voltage shift halfway through the bit period, allowing the code to be read forward or reverse, at fast or slow speeds.

Each time code word is divided into eighty bits, numbered "0"–"79", with each such bit created by such fluctuations or shifts in the voltage of the time code signal. The eighty bit time code word is divided into sets of alternating groups of four bits each, and a sixteen bit sync word. One set of alternating four bit groups represents time address bits, for identifying the video frame, while the other set of alternating four bit groups represent user bits, for recording data the user may require. The sixteen bit sync word enables detection of whether the video is running forward or reverse.

A time code decoder in the system 10 is adapted to enable video production functions, such as editing and logging, to be conducted in an efficient, frame accurate, and effective manner. It includes a plurality of functional circuits, interconnected and functionally operational, with signals at various points in such circuit.

The operations of other sections of the software are shown and described in the flow charts in FIGS. 5–13. In particular, the operations of initializations are shown and described in the flow charts in FIGS. 5–7. Also, the operations of several routines are shown and described in the flow charts in FIGS. 8–10 and 12. Further, the operations of other routines are shown and described in the flow charts in FIGS. 11 and 13, and are also described below.

Figures 1, 11:
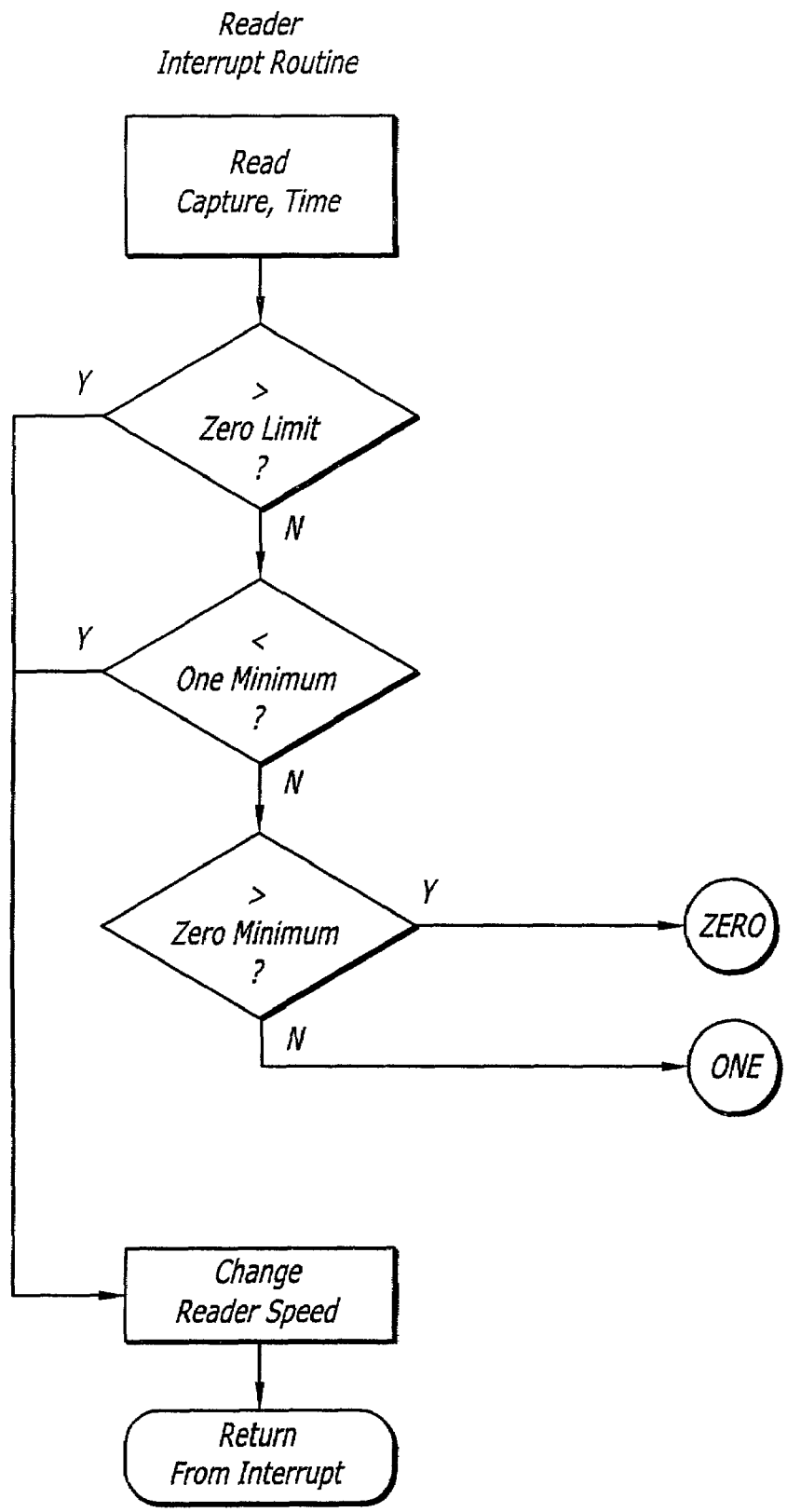
FIG. 11 is a flow chart of routines, in accordance with the invention.
Figures 2, 11:
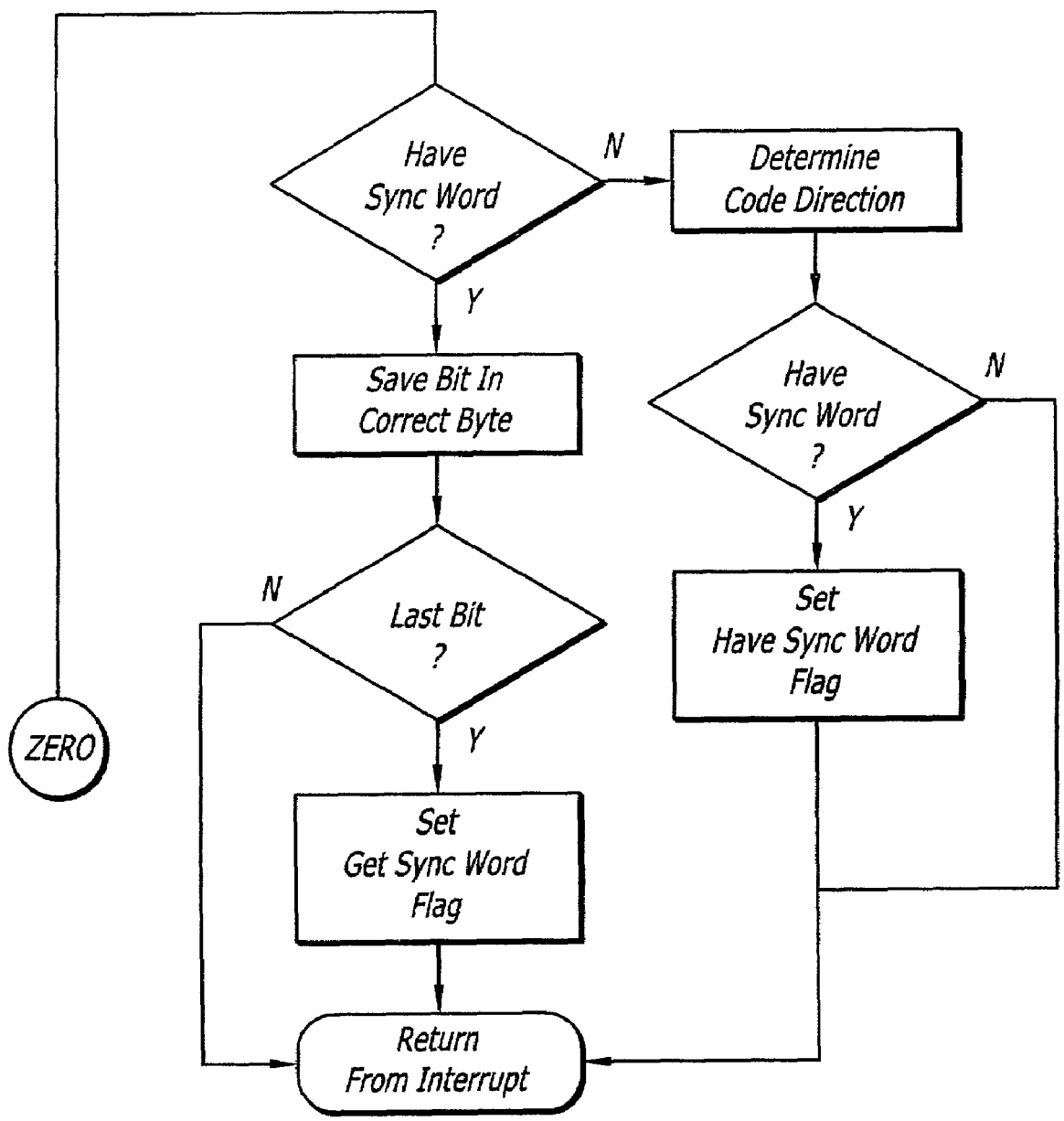
Figures 3, 11:
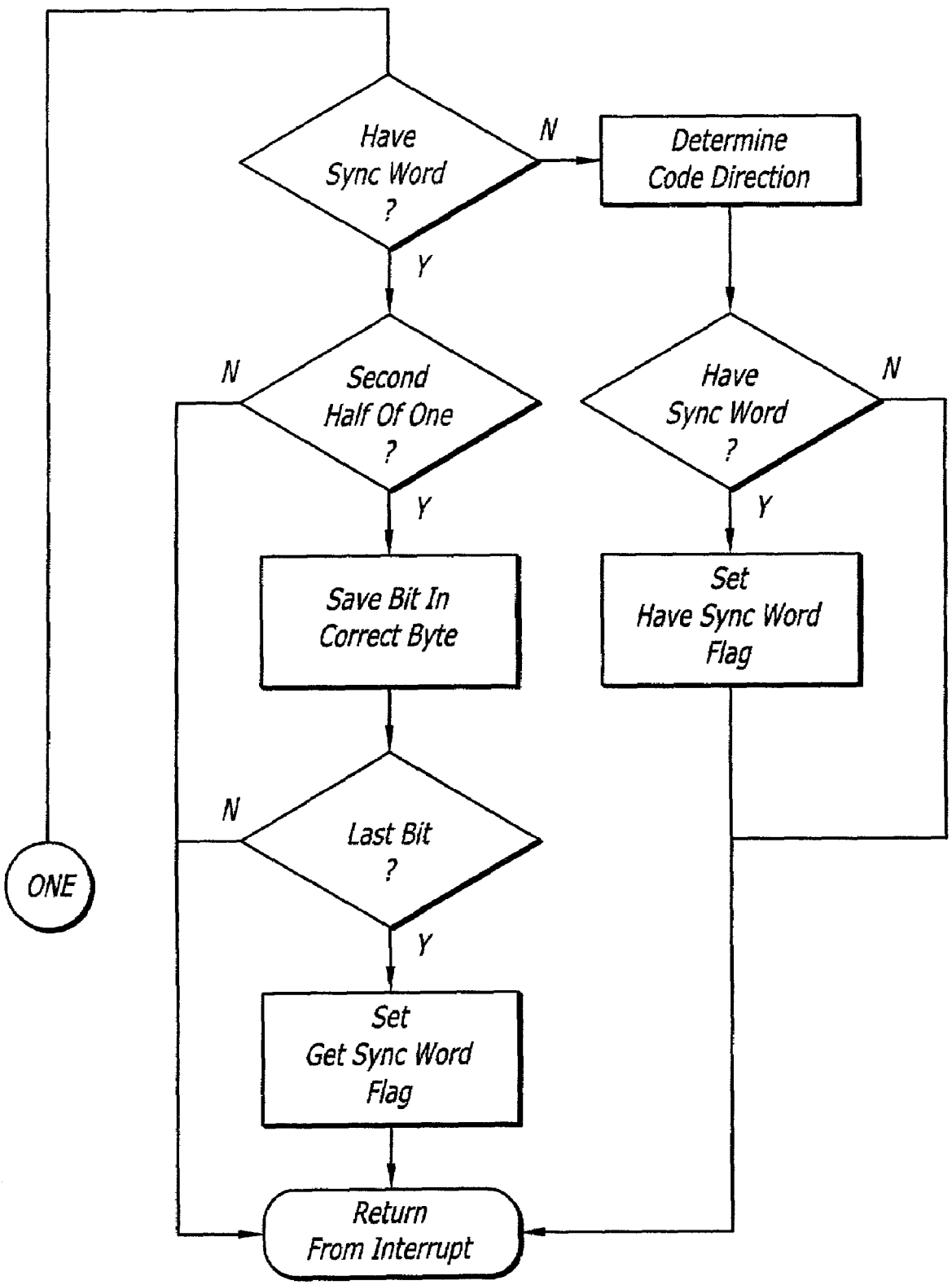

The operation of the reader interrupt routine is shown and described in the flow chart in FIG. 11. In particular, the input capture of the microprocessor is initialized to capture on the rising and falling edges of the input signal (Time Code Input). The input capture routine saves the current time of the free running counter in the input capture register when it senses a rising or falling edge. An input capture interrupt is then generated. When the microprocessor services the interrupt, the capture time is read and the previous capture time (initialized to zero on startup) is subtracted. The result is the pulse width time (bit time). The pulse width is then compared to the current reader speed value which determines if the bit is in the valid range or if the bit is invalid. If the bit is invalid, the reader is changed to a different speed, the various bit width values are saved, and the current capture time is saved. The processor exits the interrupt routine. If the bit value is valid, the processor determines if there is a valid sync word. When the syncword has been received, the current bit value is saved in the current bit location, the bit count is incremented, the current capture time is saved, and the processor exits the interrupt routine. If the current bit counter is sixty-four, the sync word flag is cleared to search for a valid sync word. The current capture time is saved and the processor exits the interrupt routine.

When the sync word has not been received and if the bit value is "1", the processor checks if it is the thirteenth "1" bit. If it is, the "1" bit counter is incremented, the Sync Flag is set, the bit counter is set to bit seventy-nine to save the bits in the correct location, the bit capture time is saved, and the interrupt routine is exited. If it is not the thirteenth "1" bit, the "1" bit counter is incremented. The Sync Flag is cleared, the bit capture time is saved, and the interrupt routine is exited. When the sync word has not been received and if the bit value is "0", the processor checks if twelve "1" bits have been received. If twelve "1" bits have not been received, the "1" bit and the "0" bit counters are reset to 0, the current capture time is saved and the processor exits the interrupt routine. If twelve "1" bits have been received and two zeros have been received (the zero counter=2 with the current zero bit), then the Time Code is running in reverse so the Reverse Code flag is set, the Sync Flag is set, the current bit counter is set to sixty-four to save the bits in the correct location, the bit capture time is saved, and the interrupt routine is exited.

Figure 13A:
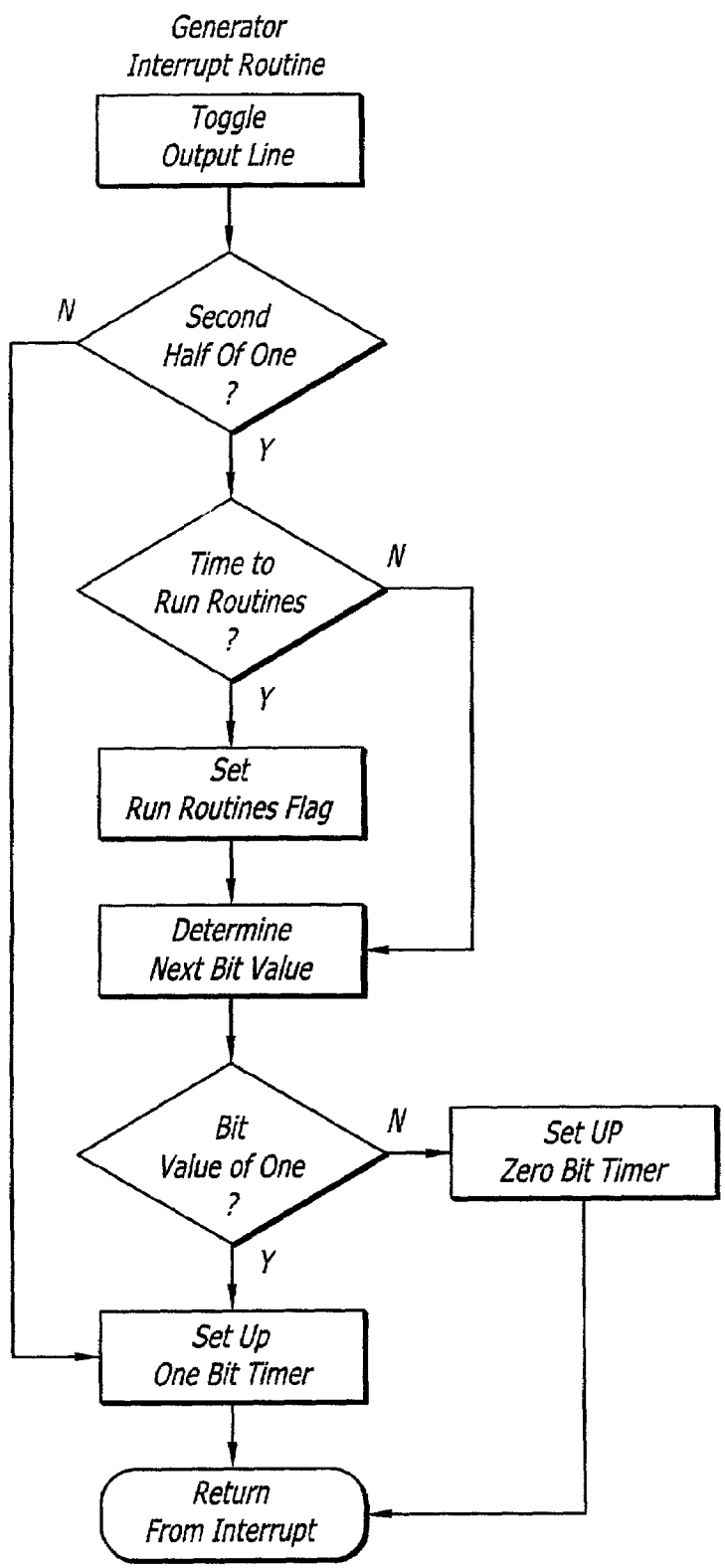
FIG. 13 is a flow chart of further routines, in the practice of the invention.
Figures 13B, 13C:
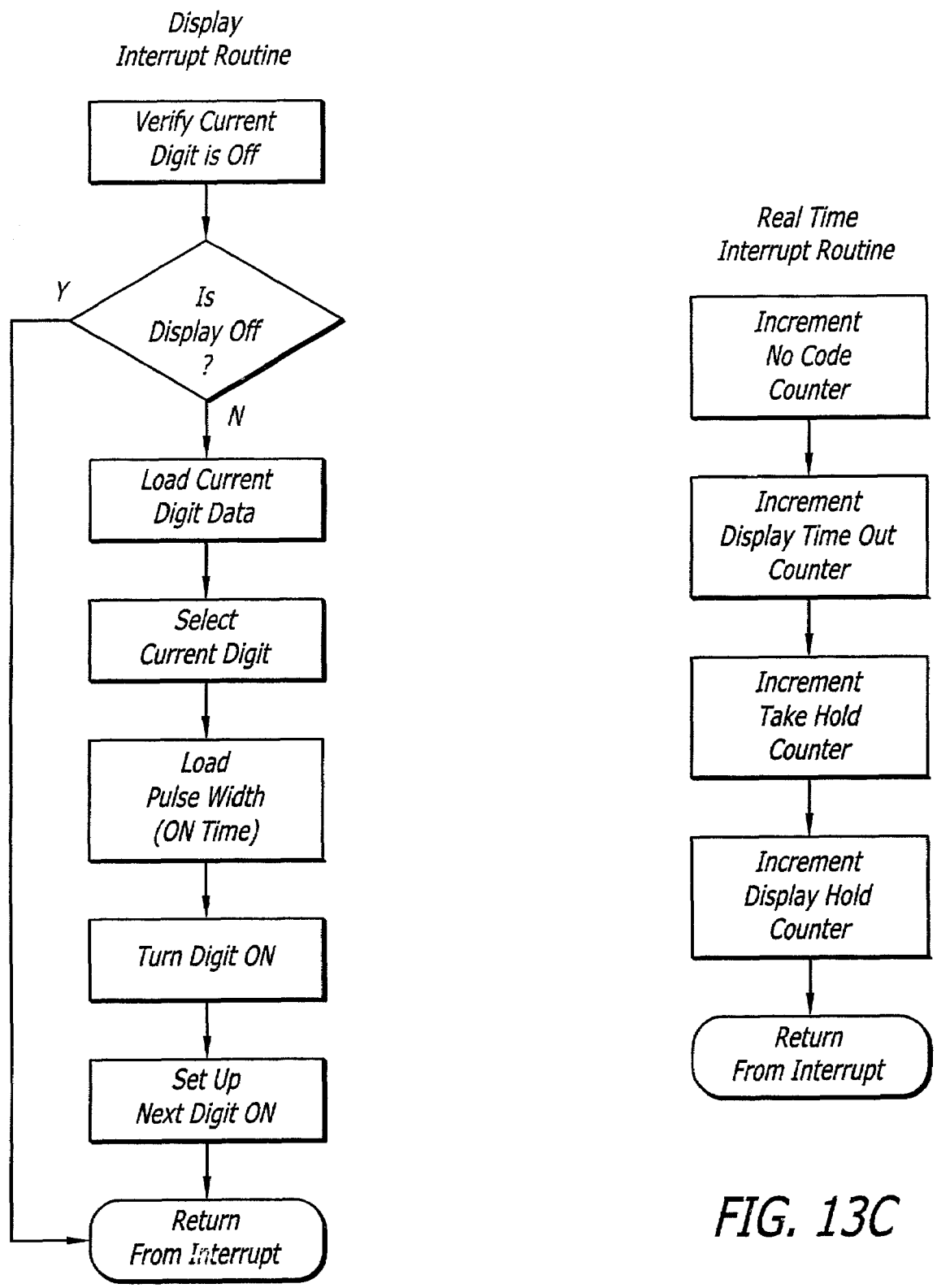

In the operation of the generator interrupt routine, as shown and described in the flow chart in FIG. 13, in particular, the output compare interrupt toggles the output pin for each bit of the current Time Code word at the current Time Code Speed (Rate). When the free running counter is equal to the compare time, an interrupt is generated. When the microprocessor services the interrupt, the output line is toggled and determines if the output is the second half of a 1 bit. If it is, the next compare time is saved in the compare register, the Second Half Flag is cleared, and the interrupt routine is exited. If it is not the second half of a 1 bit, the processor reads the next output bit and sets up the next compare time value. If the next bit is a 1, the second half flag is set, the second half time is saved for the next interrupt, and the current half time is stored in the output compare register. The interrupt routine is exited. If the next bit is a 0, the Second Half Flag is cleared and the processor reads the 1 bit value and doubles it. The result is stored in the output compare register. The interrupt routine is exited.

In particular regarding the operation of the display software routine, as also shown and described in the flow chart in FIG. 13, the output compare interrupt turns each digit ON (multiplex), determines when the digit must be turned OFF, and sets up the next digit data for the next interrupt call. When the free running counter equals the compare time (Display Frequency/8 Digits), an interrupt is generated. When the microprocessor services the interrupt, it turns the current digit OFF (may already be OFF if in LOW or MED brightness) and sends the current digit data (The Segment Data) to port b. The current free running timer value is read and the "ON Time" (Pulse Width) is added to it. The result is stored in a second output compare. This second output compare is set up (at Start Up) to toggle the D pin on the 4028 IC LOW (Turning OFF the Current Digit) on each successive compare. This is an automatic action and not an interrupt. The Current Digit is then turned ON by Selecting one of the 4028IC Pins A–C (Port C) and pulling the D pin on the 4028 IC HIGH. The next digital Data Pointer is incremented and the next digit Data is read and stored in RAM. The Capture time is read and the compare time (Display Frequency/8 Digits) is added to it. The result is stored in the output compare register. The interrupt routine is exited.

For the particular operation of the real time interrupt routine, as further shown and described in the flow chart in FIG. 13, the real time interrupt is configured at startup to generate an interrupt every 32.768 mS. When the processor services this, the interrupt counters are compared to a max value (depending on which counter it is) and each counter is incremented or stopped depending on the current value. These counters serve basic timing functions for Time Code Hold time, No Time Code detection, Display Message Time Out Value, and the like.

In accordance with the present invention, the particular embodiments set forth above for the system 10 are capable of providing the generating, synchronizing, and displaying of video time code, for recording on film or videotape during the recording of the video portion of a film or videotape in production. However, other forms of the system 10 may be utilized with the present invention without departing from the spirit and scope of the invention. Based on the present disclosure, other constructions and applications are known to one skilled in the art.

In view of the above, it is apparent that the system and method of the preferred embodiments of the present invention enhances substantially the effectiveness of the synchronization of the video time code with a master clock time code recorded in a system for recording the corresponding audio portion of the film or videotape in production. The system and method further enable the efficient setting of video and audio rates and modes of operation, the providing of portable power, and the retaining of data memory. The system and method also enable convenient scroll back operations, and the displaying of operational parameters.

While the present invention has been described in connection with the specific embodiments identified herein, it will be apparent to those skilled in the art that many alternatives, modifications and variations are possible in light of the above description. Accordingly, the invention is intended to embrace all such alternatives, modifications and variations as may fall within the spirit and scope of the invention disclosed herein.

What is claimed is:

1. A system for generating, synchronizing, and displaying time code to be recorded on film or videotape during the recording of the video portion of a film or videotape in production, to be utilized in conjunction with a master clock time code recorded in a system for the recording of the corresponding audio portion of the film or videotape in production, wherein the audio recording system is external to the displaying system, wherein the video time code displayed by the displaying system is synchronized with the audio time code recorded in the audio recording system, and wherein the system comprises a slate, comprising:
   a generating element for generating, synchronizing, and displaying the video time code, mounted in the system;
   a display for displaying the synchronized video time code, to which the generating element is connected, mounted in the system; and
   a rate-setting element for enabling the setting of a video frame rate in the slate, and a rate-warning element for warning the operator if the video frame rate set in the slate is different from an audio frame rate set in the audio recording system external to the slate.

2. A system for generating, synchronizing, and displaying time code to be recorded on film or videotape during the recording of the video portion of a film or videotape in production, to be utilized in conjunction with a master clock time code recorded in a system for the recording of the corresponding audio portion of the film or videotape in production, wherein the audio recording system is external to the displaying system, wherein the video time code displayed by the displaying system is synchronized with the audio time code recorded in the audio recording system, and wherein the system comprises a slate, comprising:
   a generating element for generating, synchronizing, and displaying the video time code, mounted in the system;
   a display for displaying the synchronized video time code, to which the generating element is connected, mounted in the system; and
   a rate-setting element for enabling the setting of a video frame rate in the slate, and a rate-determining element for automatically determining an audio frame rate set in the audio recording system external to the slate, and for locking the video frame rate to the audio frame rate.

3. The system of claim 2, further comprising a rate-determining element for automatically determining the audio frame rate, and for locking the video frame rate to the audio frame rate.

4. The system of claim 2, further comprising a scroll-back element for enabling the operator to scroll back to the display of time code at the start of a prior take.

5. The system of claim 2, wherein the compartment is further adapted to house a plurality of control knobs, and the sliding door is adapted to uncover the control knobs for access thereto without uncovering the portable power supply.

6. The system of claim 2, wherein the voltage-displaying element is adapted to display the portable power voltage in the display under load upon starting up the system.

7. The system of claim 2, wherein the settings element includes a synchronization reminding mode, adapted to be set so as to remind the user to periodically re-synchronize the video time code and the audio time code.

8. The system of claim 2, wherein the settings element includes a synchronization locking mode, adapted to be set so as to indicate that the video time code and audio time code have been synchronized, and that the system has been turned on, turned off, and turned on again, alerting the user to re-synchronize the video time code and the audio time code.

9. The system of claim 2, wherein the slate further includes a clapper adapted to be closed at the start of a take, and to freeze the time code displayed in the display element at the start of the take, and wherein the settings element includes a flash frame mode, adapted to be set so as to increase the intensity of the display upon closing the clapper to display a flash frame, and to hold the intensified display for a number of frames.

10. The system of claim 2, wherein the settings element includes a low brightness mode, adapted to be set so as to enable the lowering of the brightness of the display.

11. The system of claim 4, wherein the scroll-back element is adapted to enable scrolling back to the display of time code for the start of each of a plurality of prior takes.

12. The system of claim 11, wherein the plurality of prior take portions comprise about sixteen prior takes.

13. A method of generating, synchronizing, and displaying time code to be recorded on film or videotape during the recording of the video portion of a film or videotape in production, to be utilized in conjunction with a master clock time code recorded in a system for the recording of the corresponding audio portion of the film or videotape in production, wherein the audio recording system is external to the displaying system, and wherein the video time code displayed by the displaying system is synchronized with the audio time code recorded in the audio recording system, in a system which comprises a generating element for generating, synchronizing, and displaying the video time code, mounted in the system, a display for displaying the synchronized video time code, to which the reading element is connected, mounted in the system, a rate-setting element for enabling the setting of a video frame rate in the slate, and a rate-warning element for warning the operator if the video frame rate set in the slate is different from an audio frame rate set in the audio recording system external to the slate, wherein the method comprises:
   generating and synchronizing the video time code with the audio time code;
   reading and enabling the displaying of the video time code; and
   displaying the video time code; and
   setting the video frame rate, and warning the operator if the set video frame rate differs from the set audio frame rate.

14. A method of generating, synchronizing, and displaying time code to be recorded on film or videotape during the recording of the video portion of a film or videotape in production, to be utilized in conjunction with a master clock time code recorded in a system for the recording of the corresponding audio portion of the film or videotape in production, wherein the audio recording system is external to the displaying system, and wherein the video time code displayed by the displaying system is synchronized with the audio time code recorded in the audio recording system, in a system which comprises a generating element for generating, synchronizing, and displaying the video time code, mounted in the system, a display for displaying the synchronized video time code, to which the reading element is connected, mounted in the system, a rate-setting element for enabling the setting of a video frame rate in the slate, and a rate-determining element for automatically determining an audio frame rate set in the audio recording system external to the slate, and for locking the video frame rate to the audio frame rate, wherein the method comprises:

generating and synchronizing the video time code with the audio time code;

reading and enabling the displaying of the video time code; and displaying the video time code; and setting the video frame rate, automatically determining the set audio frame rate, and locking the video frame rate to the audio frame rate.

15. The method of claim 14, further comprising a rate-determining element for automatically determining the audio frame rate, and for locking the video frame rate to the audio frame rate, further comprising automatically determining the audio frame rate, and locking the video frame rate to the audio frame rate.

16. The method of claim 14, further comprising a scroll-back element for enabling the operator to scroll back to the display of time code at the start of a prior take, further comprising scrolling back to the display of time code at the start of the take.

17. The method of claim 14, wherein the compartment is further adapted to house a plurality of control knobs, and the sliding door is adapted to uncover the control knobs for access thereto without uncovering the portable power supply, further comprising sliding the sliding door and uncovering the control knobs without uncovering the portable power supply.

18. The method of claim 14, wherein the voltage-displaying element is adapted to display the portable power voltage in the display under load upon starting up the system, and wherein displaying the voltage comprises displaying the voltage under load upon starting up the system.

19. The method of claim 14, wherein the settings element includes a synchronization reminding mode, adapted to be set so as to remind the user to periodically re-synchronize the video time code and the audio time code, further comprising setting the settings element to remind the user to periodically re-synchronize the video time code and the audio time code.

20. The method of claim 14, wherein the settings element includes a synchronization locking mode, adapted to be set so as to indicate that the video time code and the audio time code have been synchronized, and that the system has been turned on, turned off, and turned on again, alerting the user to re-synchronize the video time code and the audio time code, further comprising setting the settings element to indicate that the video time code and the audio time code have been synchronized, and that the system has been turned on, turned off, and turned on again.

21. The method of claim 14, wherein the slate further includes a clapper adapted to be closed at the start of a take, and to freeze the time code displayed in the display element at the start of the take, and wherein the settings element includes a flash frame mode, adapted to be set so as to increase the intensity of the display upon closing the clapper to display a flash frame, and to hold the intensified display for a number of frames, further comprising setting the settings element to increase the intensity of the display upon closing the clapper to display the flash frame, and to hold the intensified display for a number of frames.

22. The method of claim 14, wherein the settings element includes a low brightness mode, adapted to be set so as to enable the lowering of the brightness of the display, further comprising setting the settings element to enable the lowering of the brightness of the display.

23. The method of claim 16, wherein the scroll-back element is adapted to enable scrolling back to the display of time code for the start of each of a plurality of prior takes, and wherein scrolling back further includes scrolling back to the time code display for the start of each of the plurality of prior takes.

24. The method of claim 23, wherein the plurality of prior take portions comprise about sixteen prior takes, and wherein scrolling back further comprises scrolling back about sixteen prior takes.

* * * * *